Figure 1:
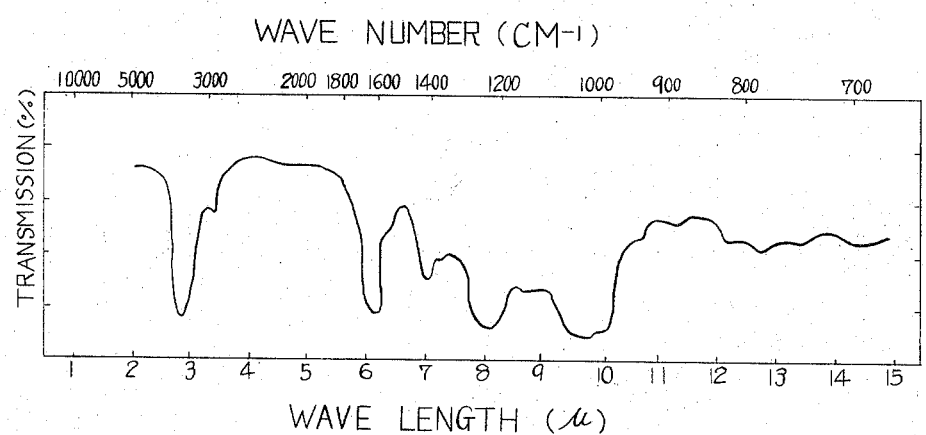

United States Patent Office 3,342,683
Patented Sept. 19, 1967

3,342,683
HEPARIN FROM WHALE TISSUE AND METHOD OF PREPARING SAME
Koroku Hashimoto, Kamakura, Zensaku Yosizawa, Sendai, and Tetsuo Shibata, Yokohama, Japan, assignors to Taiyo Gyogyo Kabushiki Kaisha, Tokyo, Japan
Filed Feb. 25, 1964, Ser. No. 347,286
2 Claims. (Cl. 167—74)

This invention relates to a novel anticoagulant substance and a process for preparing the same. More particularly, it is concerned with a novel anticoagulant substance prepared from the whale tissues, particularly from the lungs and digestive tracts such as the stomach, small intestine and large intestine (referred to hereinbelow as ω-heparin) and a process for preparing said ω-heparin from the whale tissues.

The presence of a substance capable of preventing coagulation of blood physiologically produced in the tissues of mammalian animals was found in 1916 by Howell and McLoan. The substance was then considered to be produced in the liver and named heparin in the sense of one originated from the liver. The naturally occurring anticoagulant substance has attracted the interest of a number of researchers, who have made a wide variety of investigations on chemical structure and physiological actions thereof. A great number of methods have been hitherto-fore known for the isolation of heparin as mentioned above (more exactly called α-heparin, referred to hereinbelow as α-heparin) from the tissues of cow, pig or sheep. α-Heparin prepared as above usually is in the form of the sodium salt, the biological activity of which is about 100–130 heparin units/mg. and which has a molecular weight of about 17,000. The total sulfur content is about 13.5% and no acetyl group is recognized to be present in the molecule. Barium salt of α-heparin forms sheaf or rosette crystals.

As a result of studies on the process for easily and advantageously preparing anticoagulant substances by isolating from anticoagulant substance-containing natural sources and the properties of the anticoagulant substance thus prepared we have found that ω-heparin, a novel anticoagulant substance being of excellent properties as well as being distinct from α-heparin may be easily and advantageously prepared by a novel process as described below.

It is an object of this invention to provide ω-heparin salts such as sodium, potassium and calcium salts, a novel substance prepared from the whale tissues. Another object of this invention is to provide a process for preparing easily and advantageously such ω-heparin salts by isolating from the whale tissues. Other objects will be apparent from the descriptions hereinbelow.

ω-Heparin salts, for example, sodium salt, a novel anticoagulant substance of this invention, possesses the following physical, chemical and biological properties:

ω-Heparin sodium is a white substance soluble in water and insoluble in ethanol, acetone or ether and barium salt thereof is an amorphous substance.

Analytical values of ω-heparin sodium are given below in comparison with those of the α-heparin sodium isolated from the bovine tissues. In the below-cited results of analysis nitrogen is determined by the micro-Dumas method, glucuronic acid by the carbazole method described in J. Biol. Chem., vol. 167, p. 189 (1947), by Dischs, glucosamine by the Yoshizawa's method described in Tohoku J. Exper. Med., vol. 74, p. 69 (1961), sulfur by a modification of the C. A. Antonopoulas method described in Acta Chem. Scand., vol. 16, p. 1521 (1962), and acetyl by a modification of the method described in Biochem. Biophys. Acta, vol. 38, p. 212 (1960), by J. Dudoweg and A. Dorfman.

ANALYTICAL VALUES

| | ω-Heparin sodium of this invention | Bovine α-heparin sodium |
|---|---|---|
| Nitrogen | 2.51% | 2.23%. |
| Glucuronic acid | 50.2% (1.35) | 44.2% (1.52). |
| Glucosamine | 34.2% (1.00) | 31.6% (1.00). |
| Sulfur | 9.0% (1.48) | 13.3% (2.38). |
| Acetyl | 1.96% (0.24) | 0.0% (0). |
| Ash (calc'd. as Na) | 13.1% | 15.1%. |
| $[\alpha]_D^{20}$ | +65.4° (1% in water) | +48.7° (1% in water). |

In the table above figures in the parenthesis represents molar ratio.

ω-Heparin sodium has a molecular weight of about 12,000–13,000 measured by the Archbald's method and ω-heparin sodium shows the infrared absorption spectrum indicated in FIG. 1, measured by the KBr pellet method. There are observed characteristic absorption bands at frequencies in terms of the following reciprocal centimeters: 3470, 2970, 1620, 1560, 1420, 1375, 1330, 1230, 1145, 1030, 993, 940, 890, 817, 792, 755 and 700.

Figure 2:
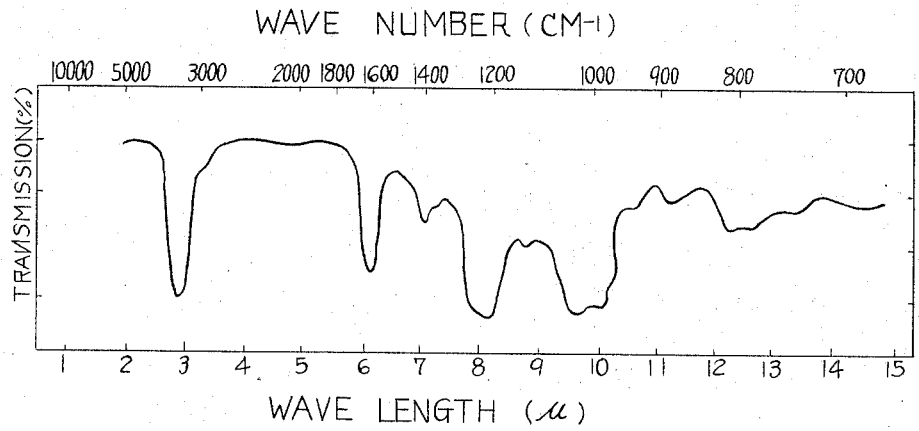

On the other hand, the bovine heparin i.e. α-heparin sodium has the infrared absorption spectrum shown in FIG. 2, measured by the KBr pellet method. There are characteristic absorption bands at frequencies in terms of the following reciprocal centimeters: 3470, 2970, 1620, 1420, 1375, 1330, 1230, 1145, 1030, 993, 940, 890, 817, 792, 755 and 700.

ω-Heparin sodium has an activity of 200–250 heparin units/mg. and $LD_{50}$ 2.9 g./kg. bodyweight.

As obvious from the descriptions given above, ω-heparin of the present invention is distinct from α-heparin hithertofore known in various respects. α-Heparin has no acetyl group in the molecule, whereas ω-heparin sodium, which is electrophoretically homogeneous, has an acetyl group in the molecule. Reference is made of this respect to the descriptions in Advances in Carbohydrate Chemistry, edited by M. Wolfrom, vol. 10, pp. 352–353 (1955), in Carbohydrates of Living Tissues, by M. Stacey et al., D. Van Nostrand Company Ltd., London, pp. 95–96 (1962), and in Anticoagulant Therapy, by A. S. Douglas, Blackwell Scientific Publication, Oxford, pp. 97–98 (1962). Among the papers reporting on α-heparin some describe α-heparin to involve acetyl group, but the heparin referred to therein contains two or more components according to the electrophoretic determination. It has been demonstrated that α-heparin corresponds to the fraction that moves most fast, which contains no acetyl group and another fraction exerting no anticoagulant activity does contain the described acetyl group. α-Heparin sodium contains sulfur as much as about 13.5%, whereas ω-heparin sodium does as much as about 9.0%. The activity is about 100–130 heparin units with α-heparin sodium, whereas about 200–250 heparin units with ω-heparin sodium. According to column chromatographic experiments by the method of Schillar et al. in J. Biol. Chem., vol. 236, p. 983 (1961), α-heparin sodium is involved in fractions eluted with 2.0 M NaCl, whereas ω-heparin sodium in fractions with 1.25–1.5 M NaCl. One milligram of the substance of this invention is neutralized with 0.96 mg. of protamine sulfate, whereas α-heparin sodium with 1.13 mg. The results of comparative tests on anticoagulant activities of ω-heparin sodium of this invention and bovine α-heparin sodium are described below.

The anticoagulant activity in vitro is assayed by the method described in the British Pharmacopoeia 1958 using sulphated ox whole blood.

Figure 3:
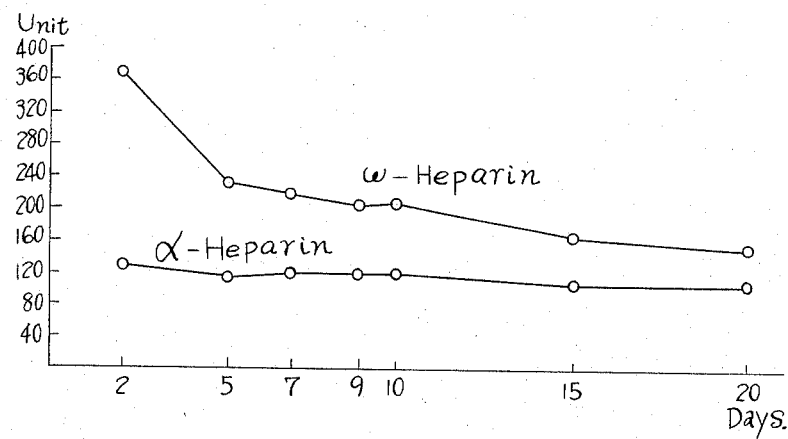

The anticoagulant activity of ω-heparin sodium is quite high when fresh sulphated ox blood is used. However, it is gradually reduced to a certain level during the storage of the blood in a refrigerator at 4° C. for several days. While on the other hand, bovine α-heparin sodium does not show such a change in the activity even when sulphated ox whole blood stored for 3 weeks is used for the assay. FIG. 3 represents effect of the period of preservation of sulphated ox blood at 4° C. on the assay of anticoagulant unit.

Although no reasonable explanation may be given for this phenomenon, the stabilized level of unitage by the use of sulphated ox blood stored for 1 week to 10 days at 4° C. for the assay is determined as the practical unit of ω-heparin sodium, which is still about twice as potent as that of the bovine α-heparin sodium.

Figure 4:
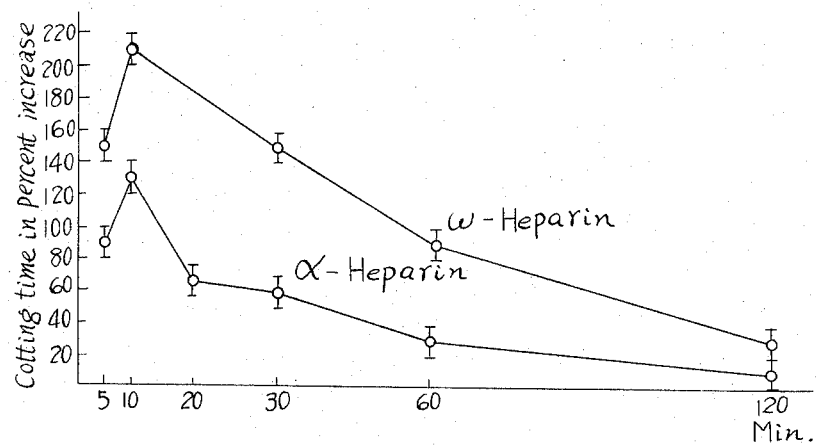

For testing the anticoagulant activity in vivo clotting time is measured by the Loew's method described in Amer. J. Med., vol. 3, p. 447 (1947), before administration and 5, 10, 20, 30, 60 and 120 minutes after intravenous administration of a fresh aqueous solution of ω-heparin sodium to dogs. FIG. 4 represents anticoagulant activities after intravenous administration of 1 mg. of the drug per kg. bodyweight in dogs. As seen from the data in FIG. 4, ω-heparin sodium shows for more potent anticoagulant activity in vivo as compared with bovine α-heparin sodium.

In vitro anticoagulant activity of ω-heparin sodium is also measured in comparison with the bovine α-heparin sodium in the same way as described above except that human whole blood was used in place of ox whole blood and human brain thrombokinase in place of ox brain thrombokinase. The results are shown below.

| Days for the storage of blood | ω-Heparin sodium of this invention, u./mg. | Bovine α-heparin sodium, u./mg. |
|---|---|---|
| 0 | 240.6 | |
| 5 | 240.02 | |
| 7 | 238.48 | 104.34 |
| 9 | 244.0 | |
| 14 | 227.9 | |
| 15 | 235.84 | 105.57 |
| 20 | 231.00 | 104.24 |

As clearly seen from the results of tests described above, the anticoagulant activities of ω-heparin sodium are about twice as high as those of the hitherto known α-heparin sodium.

Concerning the practical usability of ω-heparin sodium for the preventation of coagulation, we used this substance in animal perfusion experiments with quite satisfactory results. It qualified as an excellent anticoagulant in 68 cases of heart-lung preparations and 153 cases of perfusion experiments in dogs done in our laboratory for the past one year.

According to the present invention, the novel anticoagulant substance ω-heparin salts may be obtained by adding to an aqueous extract obtained from whale tissue a water-soluble cationic quarternary ammonium salt under acid condition within the pH range of about 2–5 in the presence of about 1–2% sodium chloride to precipitate an ω-heparin complex with the quarternary ammonium salt, isolating said complex from the aqueous mixture, dissolving the complex in at least 5% aqueous solution of a member selected from the group consisting of alkali metal and calcium chlorides and acetates and to the solution adding an organic solvent selected from the group consisting of alcohols and acetone.

The main advantage of the process of this invention is its selectivity in precipitating ω-heparin salts as described above in pure state. This is achieved by combining the anticoagulant principal contained in the whale tissue, ω-heparin, with a quarternary ammonium salt as mentioned above under acid condition of pH about 2–5 in the presence of about 1–2% sodium chloride, chemical affinity of ω-heparin with the quarternary ammonium salt is far greater than that with protein in the tissue extract of whale so that the ω-heparin is combined with the quarternary ammonium salt in place of the combined protein which is then eliminated. The acidification of aqueous extract from the whale tissue is effected by any mineral acid such as sulfuric or hydrochloric acid.

In the process of this invention may be used any water-soluble cationic quarternary ammonium salt falling with the category as described by the following formula.

The water-soluble quarternary ammonium salts useful for precipitating a water-insoluble complex with ω-heparin may be chosen from a group charactreized by the formula:

wherein X may be any anion that does not render the salt water-insoluble, e.g., chloride, bromide, sulfate, etc.: and wherein R is an aliphatic hydrocarbon chain of at least 8 carbon atoms which may be part of a heterocyclic system together with other R' radicals, said hydrocarbon chains optionally being interrupted by oxygen, double bonds, nitrogen, and aromatic rings; and wherein the R' radicals are taken from the group consisting of lower alkyls of 1–7 carbon atoms, aralkyl, alkenyl, alkoxy, polyalkoxy, and chloroalkyl.

Preferred examples of water-soluble cationic ammonium salts useful for the process of this invention are illustrated as: Dodecyl trimethyl ammonium chloride, hexadecyl trimethyl ammonium chloride and octadecyl trimethyl ammonium chloride. In addition to the compounds cited above may be used other quarternary ammonium halogenides including octyl phenoxyethoxyethyl dimethyl p-chlorobenzyl ammonium chloride, p-diisobutylcresoxyethoxyethyl dimethyl benzyl ammonium chloride monohydrate, alkyl ($C_9$–$C_{15}$) tolylmethyl trimethyl ammonium chloride, n-alkyl ($C_{12}$, $C_{14}$, $C_{16}$) dimethyl benzyl ammonium chloride, alkyl ($C_8$–$C_{18}$) dimethyl benzyl ammonium chloride, cetyl trimethyl ammonium bromide, cetyl trimethyl ammonium chloride, cetyl dimethyl benzyl ammonium chloride and dimethyl benzyl lauryl ammonium chloride.

Isolation of the ω-heparin-quarternary ammonium salt complex is achieved by a conventional method such as filtration, centrifugal separation or decantation. Separation of ω-heparin from the ω-heparin-quarternary ammonium salt complex is carried out by a conventional method. For example, the separation is effected by dissolving said complex in an aqueous solution of alkali metal and calcium salts, preferably, sodium chloride at a concentration 5% or more, adding to the solution acetone or alcohols, preferably, ethanol in volume twice or more as large and collecting thus precipitated ω-heparin salts, such as sodium salt by filtration. Further purification procedures may be eliminated for the ω-heparin salts thus obtained.

Preferred embodiment of the process according to this invention is described below.

The lung or digestive tract of whale is thoroughly pulverized followed by being subjected to autolysis or reaction of plant or animal proteinase such as papain or trypsin or bacterial proteinase such as Pronase (trade name of the product manufactured and marketed by Kaken Kagaku K. K.) for complete digestion. There is freed ω-heparin which has been combined with protein in the starting material. The digested material is then treated with a concentrated alkali solution, pH 10–11.5, to facilitate separation of the two. Most of the tissue residue precipitated are removed by filtration and the aqueous solution is acidified with $H_2SO_4$ or HCl to a pH between 2 and 5. To the acidified solution is added sodium chloride to a concentration thereof about 1–2% followed by addition of a water-soluble cationic quarternary ammonium salt such as dodecyl trimethyl ammonium chloride until no more precipitate will appear. The amount of dodecyl trimethyl ammonium chloride added is usually 5–10 ml. of the 30% aqueous solution per 1 g. of the material of the present invention.

ω-Heparin being anionic in aqueous solution is electrically neutralized by the cationic substance dodecyl trimethyl ammonium chloride to form water-insoluble complex which is precipitated out, while remaining in solution cationic protein or anionic substances such as nucleic acids and polysaccharides, which are prevented to react with the cationic quarternary ammonium salt due to the presence of NaCl and acidity of the solution. Optimum concentration of the NaCl solution is approximately 1.2% and concentrations in the extent between 1 and 2% may be employed. Higher or lower concentration induces marked reduction in the efficiency of recovery.

The aqueous solution is then subjected to filtration or centrifugal separation to collect the precipitates of the complex. The collected complex precipitates are dissolved in an aqueous solution of sodium, potassium or calcium chloride and the solution is made alkaline. Insoluble material is removed by filtration and the filtrate is made acidic followed by addition of ethanol. Thus, there is obtained sodium, potassium or calcium salt of the substance of this invention.

The following examples are given to illustrate the invention, but it should be understood that they are not intended to limit the invention in any way.

*Example 1*

To 100 kg. of pulverized lung tissue of rorqual are added 100 l. of water. The mixture is stirred for a while and allowed to stand overnight at about 10° C. On the following day the mixture is kept at 32–35° C. for about 1 hour to effect autolysis. To the autolyzate are added 10 kg. of sodium sulfate and 50 l. of water, followed by addition of sodium hydroxide to adjust the pH to 11.5. Extraction is made at 45–50° C. for 1 hour. Heating is then applied to 80° C. to coagulate the protein. The resulting mass is subjected to filtration by means of diatomaceous earth while warm. The filtrate is cooled to 10–15° C. followed by addition of diluted sulfuric acid to adjust the pH to 2.5. The precipitates then formed are collected by a centrifuge. To a suspension of the precipitates in about 30 l. of water is added bacterial proteinase Pronase (trade name, Kaken Kagaku K. K.) and digestion is carried out at 55° C. for 8 hours. After the digestion the pH is adjusted to 9.0 followed by filtration. To the filtrate, following adjustment of pH to 5.4, is added two volumes of ethanol. The precipitates thus formed are collected and dissolved in about 100 l. of water. To the solution is added sodium hydroxide to adjust pH to 9.4, a clear solution being formed. To the solution is added sodium chloride to a concentration of 1.2% followed by addition of diluted sulfuric acid to adjust pH to 3.0. To the resulting solution are added 50 ml. of 30% aqueous solution of dodecyl trimethyl ammonium chloride and the mixture is thoroughly stirred. The precipitates thus formed are collected by filtration and dissolved in 15 ml. of 10% saline solution of pH 10 adjusted with aqueous NaOH. The solution is filtered and made to pH 3.0 with diluted sulfuric acid, followed by addition of two volumes of ethanol. The precipitates thus formed are collected and dissolved in 3 l. of 10% sodium chloride solution. The resulting solution is subjected to centrifugal separation and the clear solution thus obtained is made acidic to pH 4.3 with diluted mineral acid. To the acidified solution are added two volumes of ethanol to form precipitates which are dissolved in water. The resulting aqueous solution is adjusted to pH 8.0 and then to the solution is added acetone with the amount of about 40% of the total solution. The resulting precipitates are collected and dried. The powders thus obtained weigh 6.3 g. and contain 9.0% sulfur in total and 1.96% acetyl group. Activity of 1 mg. of the powders, ω-heparin sodium has 240 heparin units.

*Example 2*

The procedures in Example 1 are repeated except that the starting materials is 100 kg. of pulverized intestine tissue of hampback, the volume of 30% aqueous solution of dodecyl trimethyl ammonium chloride is 70 ml. and the volume of 10% potassium chloride solution is 4 l. to give 9.1 g. of the dry powders, ω-heparin potassium, containing 9.05% total sulfur and 1.94% acetyl group. Activity of 1 mg. of the powders has 260 heparin units.

*Example 3*

The procedures in Example 1 are repeated except that the starting material is 50 kg. of pulverized stomach tissue of rorqual, the volumes of 30% aqueous solution of dodecyl trimethyl ammonium chloride is 35 ml. and 3 l. of 15% aqueous solution of calcium acetate is used in place of 3 l. of 10% aqueous solution of sodium chloride, there are obtained 5.4 g. of the final product powders, ω-heparin calcium, which contains 8.95% total sulfur and 2.00% acetyl group. Activity of 1 mg. of the product has 215 heparin units.

*Example 4*

Starting from 100 kg. of pulverized intestine tissue of rorqual and following the procedures in Example 1 there are obtained 5.8 g. of the final product powders, ω-heparin sodium, which contains 9.10% total sulfur and 1.90% acetyl group. Activity of the product has 245 heparin units.

We claim:

1. ω-Heparin sodium isolated from whale tissue taken from the lungs and digestive tracts of whales and being a white substance containing carbon, hydrogen, oxygen, sulfur, sodium and nitrogen; forming amorphous barium salt; being soluble in water and insoluble in ethanol, acetone and ether; having analytical values of 2.51% nitrogen, 50.2% glucuronic acid, 34.2% glucosamine, 9.0% sulfur, 1.96% acetyl and 13.1% ash calculated as Na; having a molecular weight of about 12,000–13,000; having a specific rotation $[\alpha]_D^{20} = 65.4°$ (1% in water); containing acetyl group in the molecule; and showing infrared absorption bands at frequencies 3470, 2970, 1620, 1560, 1420, 1375, 1330, 1230, 1145, 1030, 993, 940, 890, 817, 792, 755 and 700 in terms of reciprocal centimeters.

2. Process for preparing ω-heparin salts which comprises adding to an aqueous extract obtained from whale tissue emanating from the lungs and digestive tracts of whales a water-soluble cationic quarternary ammonium salt under acidic condition of pH 2–5 in the presence of about 1–2% sodium chloride to precipitate ω-heparin complex with said quarternary ammonium salt, isolating said complex from the aqueous mixture, dissolving the complex in at least 5% aqueous solution of a member selected from the group consisting of alkali metal and calcium chlorides and acetates and to the solution adding an organic solvent selected from the group consisting of ethanol and acetone to separate ω-heparin salts.

References Cited

UNITED STATES PATENTS 3,160,563   12/1964   Nazzareno _____ 167—74

SAM ROSEN, *Primary Examiner.*